July 9, 1935.   G. G. COLEMAN   2,007,494
PARACHUTE
Filed March 22, 1934   3 Sheets-Sheet 1
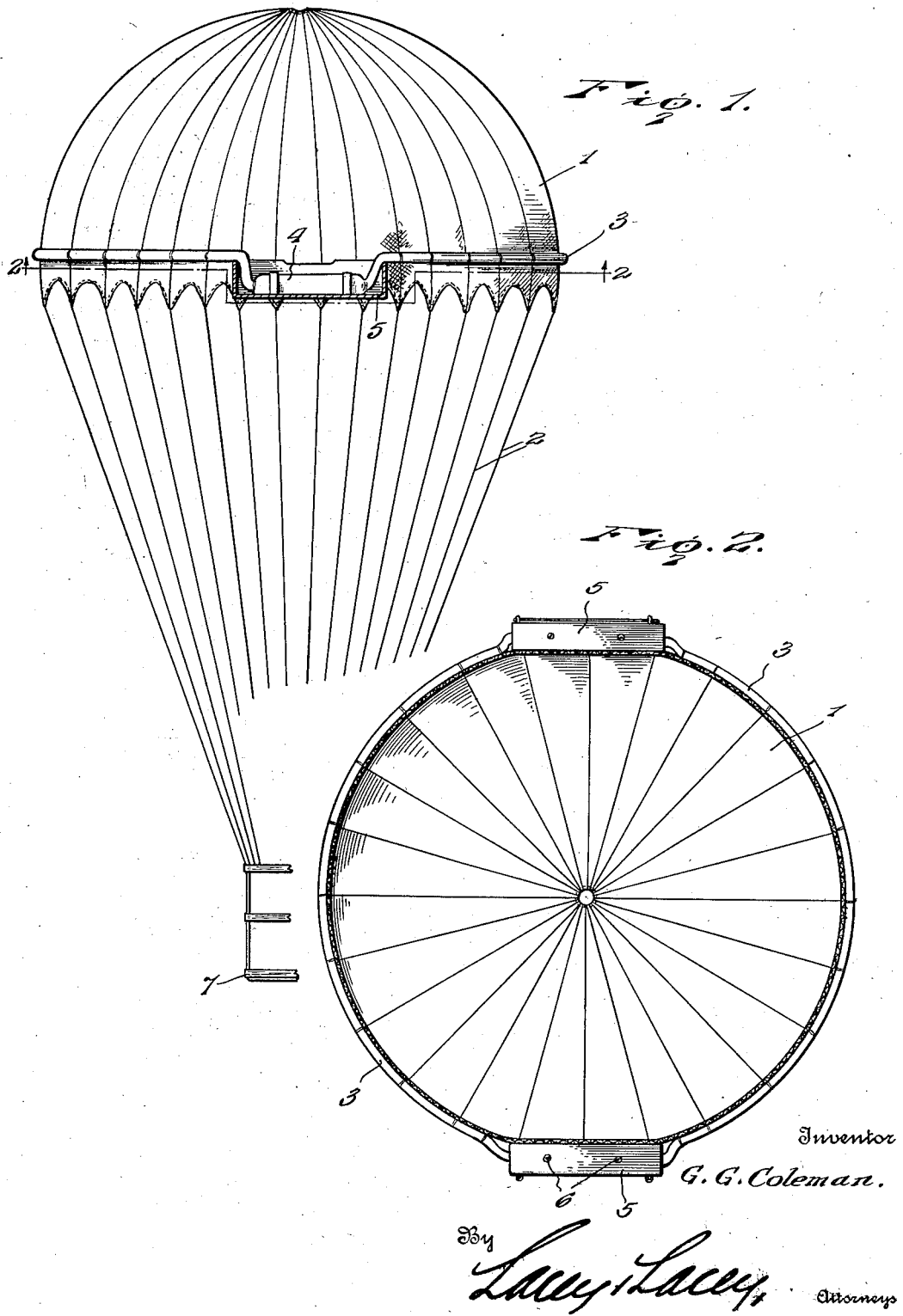

July 9, 1935.　　　　G. G. COLEMAN　　　　2,007,494
PARACHUTE
Filed March 22, 1934　　　3 Sheets-Sheet 2
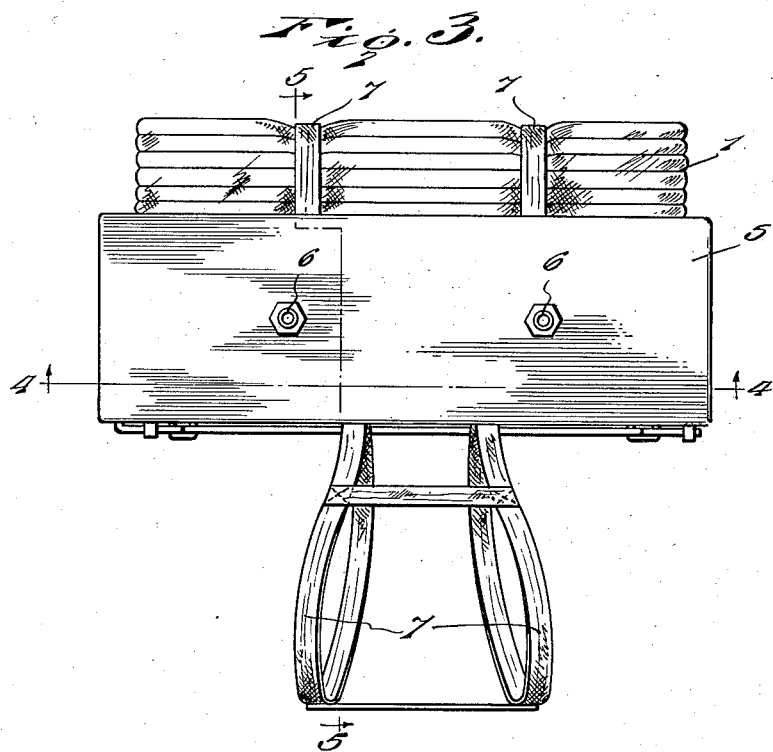
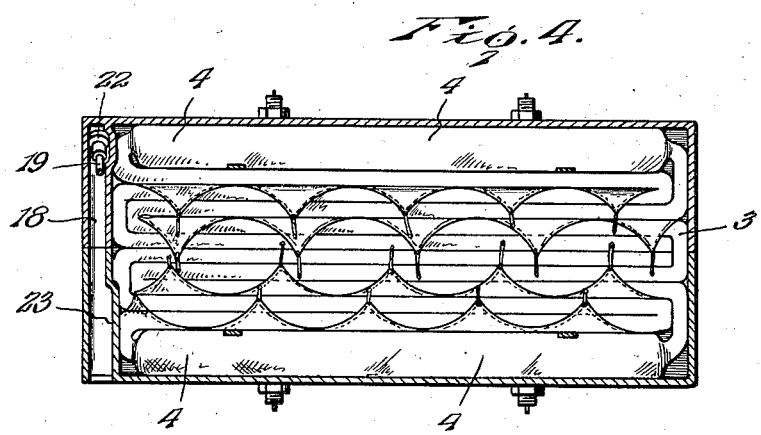
Inventor
G. G. Coleman.
By Lacey & Lacey, Attorneys July 9, 1935. G. G. COLEMAN 2,007,494
PARACHUTE
Filed March 22, 1934 3 Sheets-Sheet 3
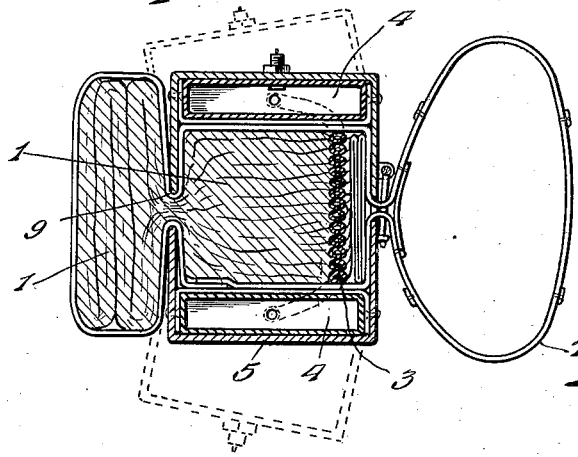
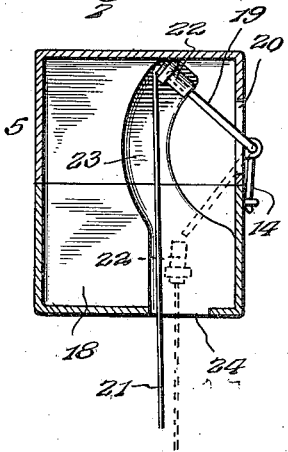
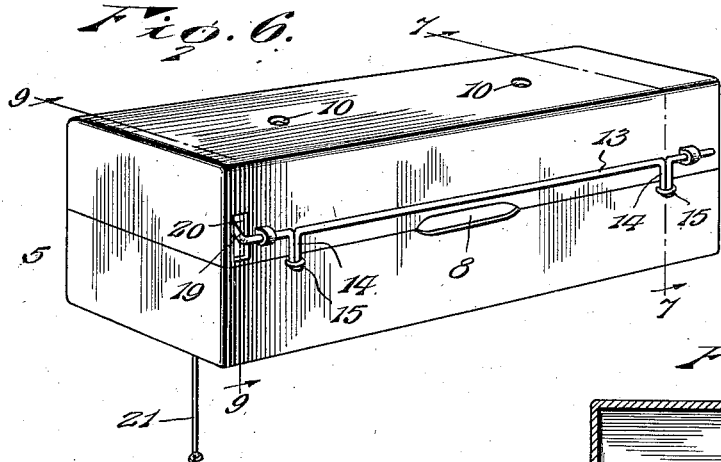
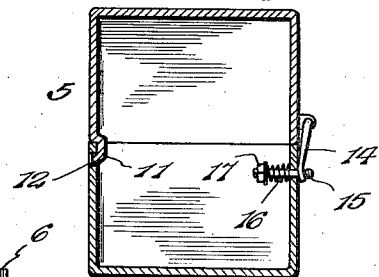
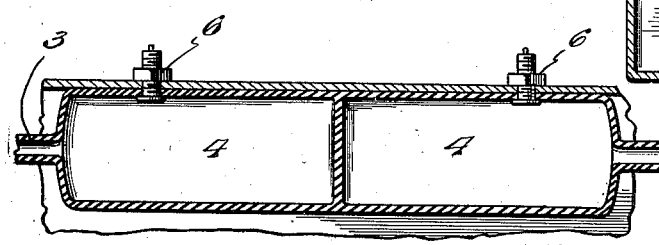
Inventor
G. G. Coleman.
By Lacey & Lacey,
Attorneys Patented July 9, 1935

2,007,494

UNITED STATES PATENT OFFICE 2,007,494

PARACHUTE

George G. Coleman, County Line, Okla., assignor of one-half to Oscar R. Dixon, County Line, Okla.

Application March 22, 1934, Serial No. 716,882

4 Claims. (Cl. 244—21)

Difficulty has been frequently experienced in the use of parachutes owing to the failure of the parachute to open quickly when its use becomes necessary. It is the object of the present invention to provide means which will be simple in construction and of such a type that it may be readily secured to the parachute and will automatically cause the parachute to open when the rip cord is pulled. The invention is illustrated in the accompanying drawings and consists in certain novel features which will be hereinafter first fully described and then more particularly defined in the appended claims.

In the accompanying drawings,

Figure 1 is a side elevation, partly in section, of a portion of a parachute having my invention applied thereto.

Figure 2 is a top plan view of the same.

Figure 3 is an enlarged plan view showing the parachute folded as it appears when not in use.

Figure 4 is a section on the line 4—4 of Figure 3.

Figure 5 is a section on the line 5—5 of Figure 3.

Figure 6 is a perspective view of the casing in which a portion of the body of the parachute is normally stored.

Figure 7 is a section on the line 7—7 of Figure 6.

Figure 8 is a detail section showing the inflation chambers.

Figure 9 is a section on the line 9—9 of Figure 6.

The body of the parachute is indicated at 1 and it may be of any known or approved form and of any suitable flexible material, shrouds or carrying cables, indicated at 2, being attached to the body at intervals around the edge of the same to depend therefrom, as will be understood. In carrying out the present invention, an inflatable tube 3 is attached to the edge of the parachute body and extends around the same with its ends connected to inflatable chambers or bags 4 which are housed within a casing or box 5 carried by the parachute. In the present drawings, I have illustrated boxes 5 and corresponding inflatable chambers disposed at diametrically opposite points of the parachute body, but it will be understood that the number of the boxes and inflatable chambers is immaterial and a single case may be employed or a plurality of cases as may seem most advantageous under any given conditions. The air chambers 4 are equipped with inflation valves 6 which extend through the adjacent wall of the case or box 5 and are adapted to be connected with a source of compressed air so that any desired pressure may be attained in the inflation bags or chambers and in the tube 3. The parachute is equipped with the usual shoulder straps 7 which are to be placed around the body and shoulders of the user when the use of the parachute becomes necessary and these straps extend through an opening 8 provided therefor in the front of the box and through a similar opening in the back of the box, being carried around the body of the parachute which is folded and disposed within the box, the upper portion of the body being disposed in collapsed form at the back of the box and an intermediate folded portion extending through the opening 9 in the rear wall of the box, as will be understood upon reference to Figure 5. As shown most clearly in Figure 7, the box is constructed in two sections, the upper section having openings 10 therethrough of sufficient diameter to accommodate the inflation valves which may be secured in place by nuts, as shown in Figures 4 and 8. The two sections of the box are detachably connected at the rear by forming one section with hooks 11 adapted to engage in openings 12 provided therefor in the other section so that the one section may rock relative to the other and the parachute may expand and pass between and from the sections. Upon the front wall of one section, a rock shaft 13 is mounted and this rock shaft is equipped with crank arms 14 adapted to engage in eyes or loops 15 slidably mounted in the lower section and yieldably held in retracted position by springs 16 coiled around the stems of the loops within the case and bearing at one end against the wall of the case and at the other end against the nut or abutment 17 mounted upon the stem, as shown in Figure 7.

The case or box is provided at one end with a compartment 18 which accommodates an operating crank or lever arm 19 at the end of the rock shaft, said crank or lever arm passing through an opening 20 in the front wall of the box, as clearly shown. The rip cord 21 is attached to a sleeve 22 which is fitted upon the free end of the lever or crank arm 19 but may readily slip therefrom when the parachute is brought into use. A groove 23 is provided in one side wall of the compartment 18 to accommodate the sleeve 22 so that the lever may move readily when the rip cord is pulled but will be held against movement until the rip cord is pulled, the rip cord depending from the lever through an opening 24 provided therefor in the bottom of the box, as will be understood.

Normally, the parachute is collapsed and folded, as shown in Figure 5, with the major portion of its body confined within the case or box 5, the inflatable tube secured around the edge of the body being disposed within the box and having its ends attached to the inflation chambers so that the compressed air fed into the chambers will pass at once into and through the tube so that it will be inflated, although it will be confined within the box and consequently cannot expand to the position shown in Figure 1 until the necessity for the use of the parachute arises, at which time the user will place the shoulder straps 7 in proper position about his body and will leap from the aeroplane or other point of danger. At the proper time, a pull will be exerted upon the rip cord so that the lever 19 will be swung downwardly, as will be understood upon reference to Figure 9, the sleeve 22 slipping from the lever so that the rip cord may depend from the shoulder straps and will not become entangled with the shrouds so as to interfere with the proper operation of the parachute. When the lever 19 is rocked downwardly, as stated, the rock shaft 13 will be rocked so that the crank arms 14 will swing outwardly and upwardly and this movement will be imparted to the eyes or loops 15 which will yield to the movement and slide outwardly until the ends of the crank have cleared the loops whereupon the loops will be at once drawn back to their normal positions by the retractile springs mounted thereon. The two sections of the box or case will, consequently, be separated and, as will be understood upon reference to the dotted lines in Figure 5, the inflated tube and the inflation chambers will be free to expand and will expand so that the parachute will be at once opened and will sustain the weight of the user, the sections of the containing case separating readily to a sufficient extent to permit the full opening of the parachute although the sections of the box or case will be retained on the body of the parachute owing to the fact that the inflation chambers 4 are fastened to the respective sections of the case.

From the foregoing description, taken in connection with the accompanying drawings, it will be seen that I have provided an exceedingly simple attachment for parachutes by the use of which opening of a parachute will be assured whenever the use of the same becomes necessary.

Having thus described the invention, I claim:

1. A parachute having an inflatable tube attached to its body at the edge of the same, a container, air chambers within the container to which the ends of the inflated tube are secured whereby the container is held on the parachute, the tube and the body of the parachute being foldable within the container while the tube is in an inflated condition, the container consisting of loosely connected sections, inflation valves inserted through the walls of the container and air chambers and securing them together, means for holding the sections normally in closed relation, and means for releasing the last-mentioned means whereby the sections of the container may open and permit the parachute to open as the inflated tube expands.

2. An attachment for parachutes comprising a case, an inflatable tube foldable within the case and adapted to be secured to the edge of a parachute body, inflation chambers within the case secured thereto and having the ends of the tube attached thereto, the case being constructed in sections releasably engaged in closed position, a rock shaft mounted on one section of the case and provided with crank arms, eyes slidably mounted in the other section and yieldably held retracted and engaged by said crank arms, and means for connecting a rip cord with the rock shaft whereby to release the sections of the case and permit the inflated tube to expand and open the parachute.

3. An attachment for parachutes comprising a sectional case, means for releasably holding the sections of the case together, air chambers secured within the case, an inflatable tube connected with the air chambers and adapted to be secured upon the body of a parachute at the edge thereof, the tube and the parachute being foldable within the case, a rock shaft mounted on one section of the case and provided between its ends with crank arms and with an operating lever disposed at an angle to the crank arms, the case having a compartment accommodating the operating lever, eyes slidably mounted on the other section of the case and engaged by the crank arms, yieldable means for holding the eyes normally retracted, and a rip cord attached to the operating lever.

4. An attachment for parachutes comprising a case having a compartment at one end provided with an arcuate groove in one side wall, air chambers within the case, an inflatable tube adapted to be secured upon the body of a parachute at the edge thereof and having its ends connected to the air chambers, the inflated tube and the body of the parachute being foldable within the case, means for yieldably holding the case closed, said means including a rock shaft having a lever at one end disposed within the compartment of the case, a sleeve loosely fitted on the end of the lever and working in the groove in the wall of the compartment, and a rip cord attached to said sleeve whereby a pull upon the rip cord will release the case and permit the same to open and the inflated tube to expand and open the parachute.

GEORGE G. COLEMAN. [L. S.]